US010660349B2

(12) United States Patent
Cocchi et al.

(10) Patent No.: US 10,660,349 B2
(45) Date of Patent: May 26, 2020

(54) FLOODED EVAPORATOR

(71) Applicant: ALI GROUP S.r.l.—CARPIGIANI, Cernusco sul Naviglio (Milan) (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernuscosul (IT)

( * ) Notice: Subject to any disclaimer, the term of this patent is extended or adjusted under 35 U.S.C. 154(b) by 156 days.

(21) Appl. No.: 15/928,929

(22) Filed: Mar. 22, 2018

(65) Prior Publication Data
US 2018/0289035 A1 Oct. 11, 2018

(30) Foreign Application Priority Data

Apr. 6, 2017 (IT) .......................... 102017000038243

(51) Int. Cl.
*A23G 9/28* (2006.01)
*A23G 9/08* (2006.01)
(Continued)

(52) U.S. Cl.
CPC .............. *A23G 9/281* (2013.01); *A23G 9/045* (2013.01); *A23G 9/08* (2013.01); *A23G 9/22* (2013.01);
(Continued)

(58) Field of Classification Search
CPC . A23G 9/281; A23G 9/08; A23G 9/22; A23G 9/224; A23G 9/045; F25B 39/028;
(Continued)

(56) References Cited

U.S. PATENT DOCUMENTS 1,866,991 A 7/1932 Zieber
2,972,239 A * 2/1961 Vasby ..................... A23G 9/224
62/342
(Continued)

FOREIGN PATENT DOCUMENTS

EP 2936993 A1 10/2015
WO WO0107846 A1 2/2001

OTHER PUBLICATIONS

SWEP International AB, Refrigerant Handbook, Evaporators, Flooded Evaporators, Feb. 14, 2017, pp. 1-8, Retrieved from the Internet: URL:https://web.archive.org/web/2017021412131 0/https://www.swep.net/refrigerant-handbook/6.-evaporators/asas2/ (Year: 2017).*

(Continued)

*Primary Examiner* — Steve S Tanenbaum
(74) *Attorney, Agent, or Firm* — Shuttleworth & Ingersoll, PLC; Timothy K. Klima

(57) ABSTRACT

A machine for making and dispensing cold or iced products includes: an element for containing the product to be dispensed and equipped with a mouth for dispensing the food product; a dispenser located at the mouth for dispensing the food product and able to be turned on or off to allow the food product to be dispensed; a thermal treatment cylinder; a stirrer, coaxial with the thermal treatment cylinder and adapted to rotate about a respective axis of rotation; a refrigeration system in which a refrigerant fluid circulates and includes an evaporator associated with the thermal treatment cylinder, a condenser, a pressure reducing element and a compressor; wherein the evaporator includes a first tubular member and a second tubular member extending along an axial direction parallel to the axis of rotation X, the second tubular member being inserted inside the first tubular member to define an annular chamber extending uninterruptedly.

14 Claims, 10 Drawing Sheets

(51) Int. Cl.
*A23G 9/22* (2006.01)
*F25B 39/02* (2006.01)
*F25B 39/00* (2006.01)
*A23G 9/04* (2006.01)
*F25B 25/00* (2006.01)

(52) U.S. Cl.
CPC .............. *A23G 9/224* (2013.01); *F25B 39/00* (2013.01); *F25B 39/028* (2013.01); *F25B 25/005* (2013.01); *F25B 39/02* (2013.01); *F25B 2339/0242* (2013.01); *F25B 2400/13* (2013.01); *F25B 2400/23* (2013.01)

(58) Field of Classification Search
CPC .................. F25B 39/00; F25B 2400/13; F25B 2339/0242
USPC ............................................................ 62/68
See application file for complete search history.

(56) References Cited

U.S. PATENT DOCUMENTS

| | | | |
|---|---|---|---|
| 5,575,066 A * | 11/1996 | Cocchi | B23P 15/26 29/890.035 |
| 6,370,892 B1 | 4/2002 | Ross | |
| 2013/0327080 A1 | 12/2013 | Sipp et al. | |
| 2015/0096322 A1* | 4/2015 | Cocchi | A23G 1/56 62/238.7 |
| 2015/0230496 A1* | 8/2015 | Sipp | A23G 9/045 62/342 |

OTHER PUBLICATIONS

Italian Search Report dated Nov. 29, 2017 for counterpart Italian Application No. IT102017000038243.
SWEP International AB, Refrigerant Handbook, Evaporators, Flooded Evaporators, Feb. 14, 2017, pp. 1-8, Retrieved from the Internet: URL:https://web.archive.org/web/20170214121310/https://www.swep.net/refrigerant-handbook/6.-evaporators/asas2/.

* cited by examiner

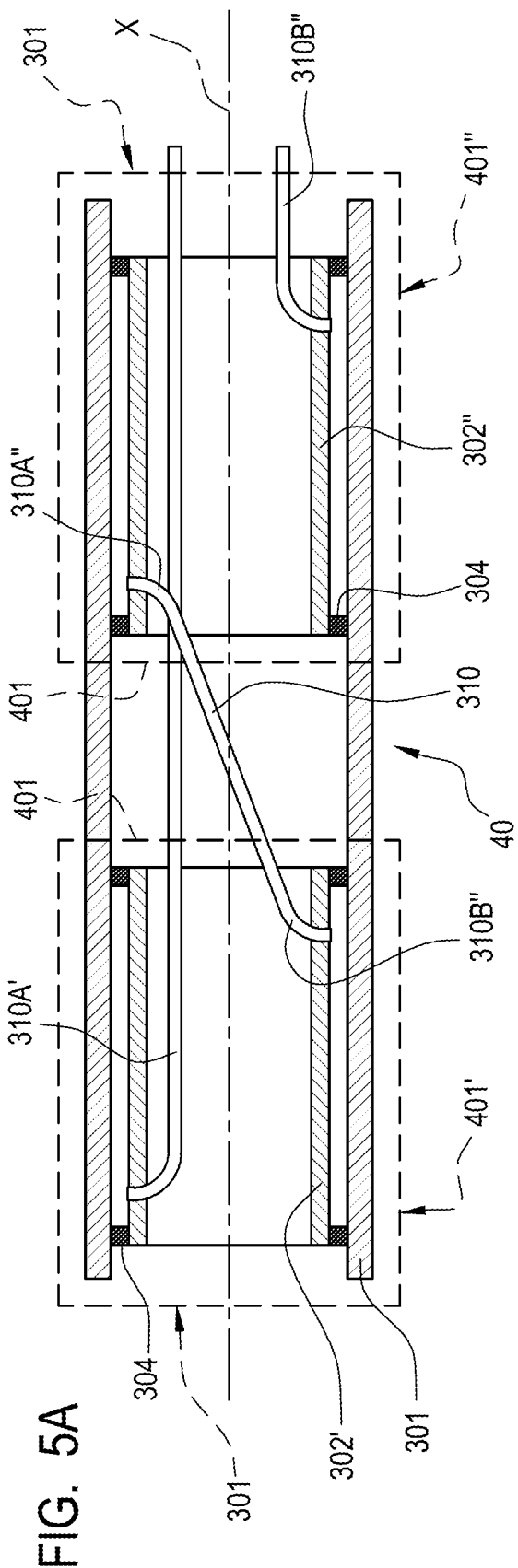

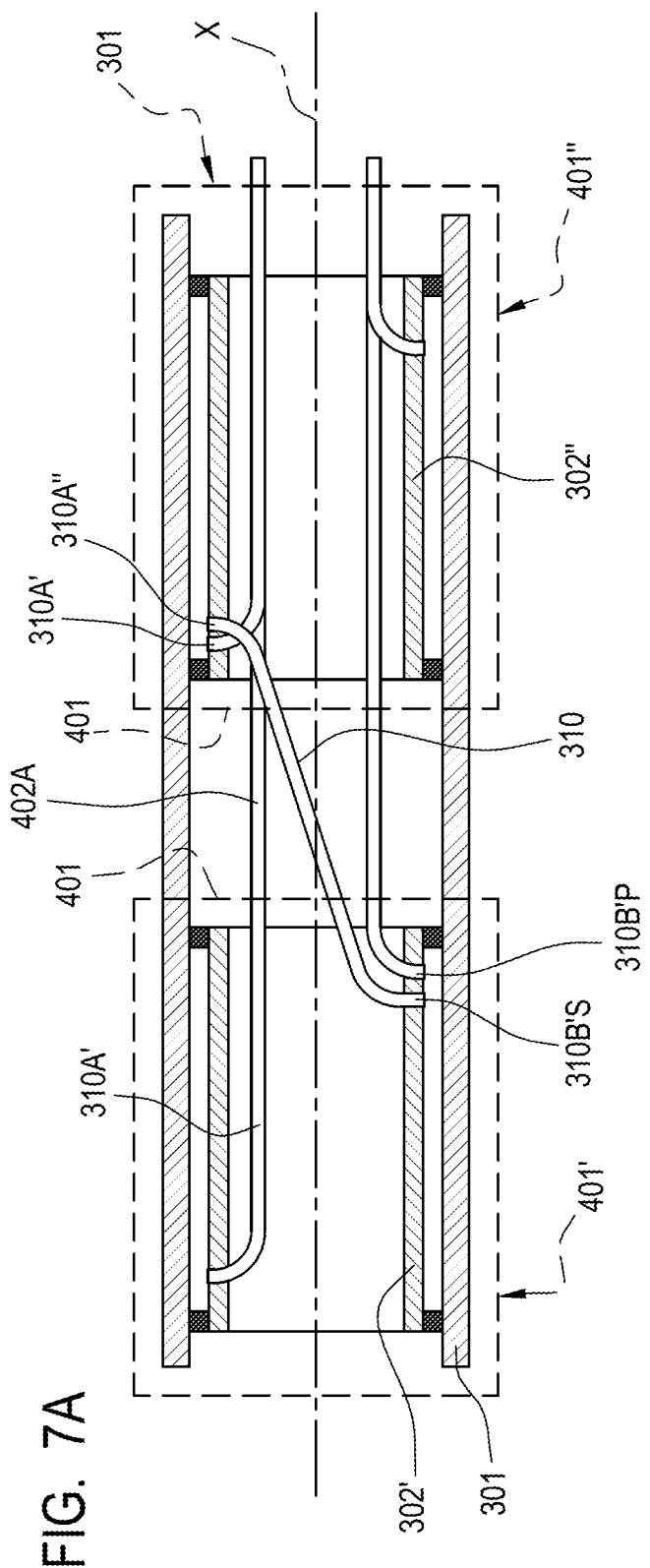

FLOODED EVAPORATOR

This application claims priority to Italian Patent Application 102017000038243 filed Apr. 6, 2017, the entirety of which is incorporated by reference herein.

BACKGROUND OF THE INVENTION

This innovation relates to a machine for making liquid or semi-liquid food products, specifically cold products such as, but not limited to, for example, slush drinks, sorbets dessert creams, artisan gelatos or soft ice creams, where the refrigeration system responsible for cooling the liquid product is internally provided with a flooded evaporator instead of a dry evaporator.

Hence, the industrial context which this disclosure addresses is that of machines for making (cold) liquid or semi-liquid products.

In these industrial applications, there is an increasingly widespread need to improve the efficiency of the machines, in particular the energy efficiency, and thus the heat exchange efficiency of the refrigerating systems of the machines.

It is known that the refrigeration systems of machines for making cold, liquid or semi-liquid food products are of the "dry" type. The term "dry" in this context is used to mean the feature of the refrigeration system whereby the heat exchanger fluid flowing out of the evaporator is in the form of superheated vapor, that is to say, free of the liquid phase, and can therefore be directed into the compressor without the risk of damaging the compressor with the liquid droplets dispersed in the vapor. Experiments conducted by the Applicant have shown that the total heat-exchange coefficient is directly proportional to the density of the fluids in contact: the higher the percentage of vapor relative to liquid, the lower the heat exchange efficiency. It may also be observed that until it reaches the state of saturated vapor, the heat exchanger fluid has the same temperature. That is because the quantity of heat extracted is used for the change of phase. Thus, the difference in temperature between the heat exchanger fluid and the surroundings decreases at a first decreasing rate. When the heat exchanger fluid reaches the state of saturated vapor, the full amount of heat transferred from it to the surroundings is used to increase the temperature which leads to an increase in the decreasing rate of the temperature difference between the heat exchanger fluid and the surroundings.

SUMMARY OF THE INVENTION

The aim of this innovation is to meet the above mentioned need to increase the heat exchange efficiency of these machines by providing a machine for making liquid or semi-liquid food products, specifically cold products such as, but not limited to, for example, slush drinks, sorbets dessert creams, artisan gelatos or soft ice creams.

More specifically, the aim of this innovation is to provide a machine for making liquid or semi-liquid food products, specifically cold products such as, but not limited to, for example, slush drinks, sorbets dessert creams, artisan gelatos or soft ice creams, and which allows increasing the heat exchange coefficient between the heat exchanger fluid and the cold, liquid or semi-liquid product in the evaporator.

These and other aims are substantially achieved by the machine for making liquid or semi-liquid food products, specifically cold products such as, but not limited to, for example, slush drinks, sorbets dessert creams, artisan gelatos or soft ice creams, as disclosed herein.

According to one aspect of it, this disclosure relates to a machine for making liquid or semi-liquid food products, specifically cold products such as, but not limited to, for example, slush drinks, sorbets dessert creams, or ice creams. In one embodiment, the machine comprises at least one element for containing (containing vessel) and processing the product to be dispensed and having a front wall which is provided with at least one mouth for dispensing the liquid or semi-liquid product. The machine comprises a dispenser located at the mouth for dispensing the product and movable between two operating configurations. In a first operating configuration, which we will call "On", the dispenser allows the liquid or semi-liquid product to be dispensed through the dispensing mouth, whilst in a second operating configuration, which we shall call "Off", the dispenser closes the dispensing mouth and keeps the liquid or semi-liquid product in the containing tank.

In one embodiment, the machine comprises a thermal treatment cylinder.

In one embodiment, the thermal treatment cylinder is mounted inside a product containing tank and heat exchange (between product and cylinder) occurs through an outside wall of the thermal treatment cylinder. In another embodiment, the thermal treatment cylinder itself contains the product to be processed and heat exchange (between product and cylinder) occurs through an inside wall of the thermal treatment cylinder.

In one embodiment, the thermal treatment cylinder comprises a heat exchanger, which we shall call "evaporator", forming part of the refrigeration system of the machine. The term "evaporator" underlines the function of this component, which is adapted to transfer heat from the product in the containing element (containing vessel) to the refrigerant fluid contained in the evaporator itself.

In a preferred embodiment, the evaporator comprises a first tubular element, a second tubular element, coaxial with the first tubular element, a plurality of elements for fastening the tubular elements and a plurality of accesses to an annular chamber formed between the first tubular element and the second tubular element.

The annular chamber is characterized by a radial extension, defined as the difference between the internal diameter of the first tubular element and the external diameter of the second tubular element, by an axial extension, defined as the length of the annular chamber along the axis of the treatment cylinder, and by an angular extension, defined as the angle subtended by the annular chamber relative to the center of the base circles of the first and second tubular elements.

Preferably, the annular chamber extends uninterruptedly along the axial direction of extension of (first and second) tubular elements, that is to say, it does not have partitions and interrupting elements, so that the fluid flows along the axial direction of extension of the (first and second) tubular elements.

In one embodiment, the radial extension of the annular chamber is less than or equal to 12 mm. In another embodiment, the maximum radial extension of the annular chamber is 8 mm (that is, less than or equal to 8 mm). In another embodiment, the maximum radial extension of the annular chamber is 4 mm (that is, less than or equal to 4 mm).

In another embodiment, the maximum radial extension of the annular chamber is 2 mm (that is, less than or equal to 2 mm).

In a preferred embodiment, the first tubular element may coincide with the wall of the thermal treatment cylinder, making the system more compact and placing in more direct contact the two fluids which are in a state of thermal disequilibrium. In another embodiment, the tubular element may be smaller in radius than the thermal treatment cylinder so as to prevent radial pressure stress on the thermal treatment cylinder. In one embodiment, the first and second tubular elements differ in radial thickness. The radial thickness of the first tubular element is smaller than the radial thickness of the second tubular element so as to reduce the distance between the two fluids engaged in the heat exchange process.

In one embodiment, the fastening elements are welds, with or without filler material. In another embodiment, the fastening elements may be special glues or tap bolts.

In one embodiment, the accesses to the annular chamber are formed on the outside surface of the first tubular element. In another embodiment, the accesses are formed on the inside surface of the second tubular element.

In one embodiment, the accesses are of at least of two types. A first type, which we will call "injection cavity", comprises those cavities traversed by the fluid in a direction from the outside to the inside of the evaporator. A second type, which we will call "collection cavity", comprises those cavities traversed by the heat exchanger fluid in a direction from the inside to the outside of the evaporator. In one embodiment, the accesses may also have different functions such as, but not limited to, for example, lubricating the annular chamber, cleaning the annular chamber, inspecting the annular chamber or injecting chemical additives to modify the properties of the refrigerant fluid.

In one embodiment, the evaporator comprises one injection cavity and one collection cavity. The injection cavity is connected to an injection element. The injection element is a pipe made of heat-resistant material welded to the injection cavity of the evaporator. In one embodiment, the injection element reaches the injection cavity through the internal cavity of the second tubular element.

The collection cavity is connected to a collection element. The collection element is a pipe made of heat-resistant material welded to the collection cavity of the evaporator.

In one embodiment, the collection element reaches the collection cavity through the internal cavity of the second tubular element.

In another embodiment, the injection and collection elements may be two manifolds that are larger in diameter than the single tubular injection and collection elements and capable of channeling the flow of two or more evaporators mounted in parallel to form a modular evaporator. In another embodiment, on the other hand, the injection and collection elements may coincide for an evaporator in which the modules are mounted in series. In effect, in this embodiment, the injection element of the module downstream, the module which precedes in the direction of flow of the refrigerant fluid, coincides with the collection element of the module upstream, the module which follows in the direction of flow of the refrigerant fluid.

The machine comprises a stirrer for mixing the product and mechanically scraping any iced layers that may form on the walls of the thermal treatment cylinder. In one embodiment, the stirrer is mounted on the outside surface of the thermal treatment cylinder, wound around it in screw-like fashion. The stirrer is adapted to rotate about an axis of rotation, preferably coinciding with the axis of symmetry of the thermal treatment cylinder.

In another embodiment, on the other hand, the stirrer is mounted in such a way as to remain in contact with an inside surface of the thermal treatment cylinder (in order to scrape it). In one embodiment, the inside wall of the thermal treatment cylinder is the inside wall of the second tubular element. In this embodiment, the stirrer may be a screw wound around a drive shaft. In another embodiment, the stirrer comprises a plurality of radial stirring blades keyed to a shaft (connected to a motor).

The machine comprises a refrigeration system to cool the product inside the containing element. The term "upstream" is used in this disclosure to indicate a component location situated before the one referred to in the direction of flow of the heat exchanger fluid, whilst "downstream" is used to describe a component location situated after the one referred to in the direction of flow of the heat exchanger fluid.

In one embodiment, the refrigeration system comprises a first heat exchanger, which we will call "condenser", adapted to release heat to the surroundings, causing the heat exchanger fluid to condense (in this disclosure, the heat exchanger fluid is also called refrigerant fluid. The condenser is connected to the compressor downstream and to a pressure reducing element (for example, but not necessarily, a throttle valve) upstream. The pressure reducing element allows laminating the fluid flow out of the condenser. In one embodiment, the pressure reducing element is a pin throttle valve whose variable size orifice regulates the pressure drop due to concentrated pressure loss. In one embodiment, the throttle valve is connected to the condenser downstream and to the separation system upstream.

The refrigeration system comprises a compressor for compressing the vapor downstream of the phase separator of the separation system. The compressor is connected to the condenser so as to restart the refrigerating cycle of the machine.

The refrigeration system comprises a second heat exchanger, which we will call "evaporator", adapted to extract heat from the surroundings, thus cooling the product to be dispensed.

This evaporator is defined as "flooded". This definition, for an expert in the field, refers to the feature whereby the refrigerant fluid, during heat exchange in the evaporator, is always in the zone where the two phases coexist and never in the form of superheated vapor. Advantageously, the heat exchange in the zone where the two phases coexist increases the total heat-exchange coefficient. This advantage translates as cooling at a quicker rate and consequently, lower energy consumption for the same performance in terms of product cooling.

In one embodiment, this refrigeration system, configured for evaporation in the zone of phase coexistence, comprises a separation system. The separation system is designed to send refrigerant fluid in the liquid state to the evaporator so as to facilitate a continuing state of phase coexistence in the evaporator, thereby increasing heat exchange, and also to send saturated vapor free of dispersed liquid droplets to the compressor in order to avoid structural damage to the compressor, whose function is to compress that vapor.

In one embodiment, the separation system is located in the refrigeration system upstream of the evaporator and of the compressor, downstream of the throttle valve and of the evaporator. In this embodiment, therefore, the evaporator is included in a closed circuit with the separation system from which it withdraws liquid and into which it feeds refrigerant fluid in a state of phase coexistence. In another embodiment, the separation system is located upstream of the compressor and downstream of the evaporator.

In one embodiment, the separation system comprises a phase separator. In one embodiment, the phase separator works by gravity. In one embodiment, the phase separator works by mixing. In another embodiment, the phase separator works by gravity and mixing simultaneously.

In one embodiment, the phase separator comprises at least three accesses to the internal separation chamber. One inlet receives the fluid in the state of phase coexistence from the throttle valve. A first outlet supplies saturated liquid to be sent to the evaporator. A second outlet supplies saturated vapor to be compressed in the compressor.

In another preferred embodiment, the phase separator comprises at least four accesses to the internal separation chamber. A first inlet receives the fluid in the state of phase coexistence from the throttle valve. A second inlet receives the fluid in the state of phase coexistence from the evaporator after evaporation. A first outlet supplies saturated liquid to be sent to the evaporator. A second outlet supplies saturated vapor to be compressed in the compressor.

Advantageously, the phase separator on the one hand allows sending to the compressor saturated vapor which is free of dispersed liquid droplets potentially harmful to the compressor and, on the other, to send saturated liquid to the evaporator, so as to increase the total heat exchange coefficient by facilitating the continuation of the state of phase coexistence in the evaporator.

In one embodiment, the separation system also comprises a liquid pump located downstream of the phase separator and upstream of the evaporator. The liquid pump allows the saturated liquid to reach and then re-enter the phase separator. The liquid pump substantially makes up for the load losses in the closed circuit exiting the phase separator, passing through the evaporator and re-entering the phase separator.

In one embodiment, the machine comprises a control unit for the automatic control of remotely drivable parts such as for example, but not limited to, valves, taps and circulation pumps. In one embodiment, the machine also comprises a user interface connected to the control unit to control and modify working parameters such as for example, but not limited to, product temperature, flow rate of heat exchanger fluid and rotation of the stirrer and/or of the compressor.

In one embodiment the evaporator comprises a single evaporation module with the respective injection cavities and collection cavities.

In another embodiment, the evaporator comprises a plurality of evaporation modules which can be made according to three different variant embodiments.

In a first variant embodiment, the evaporation modules are, from a functional viewpoint, mounted in series.

That way, with reference to the direction of fluid flow in the system, there is at least one upstream evaporation module that is connected to at least one downstream evaporation module.

Mounting the evaporation modules in series means that the injection flow rate of a downstream module is the same as the collection flow rate of the upstream module.

In other words, after flowing through the evaporation module upstream, the fluid is conveyed into the evaporation module downstream.

In most cases, in such a configuration, the injection and collection elements of the evaporation modules coincide. More specifically, the injection element of the evaporation module downstream corresponds to the collection module upstream. In this series configuration, the evaporator also comprises, in one embodiment, a plurality of automatic valves and taps capable of selecting the path followed by the refrigerant fluid, isolating some of the modules when necessary and making the system more versatile. In other words, in use, the number of active evaporation modules in which the refrigerant flows can be varied by actuating the taps and valves.

In a second variant embodiment, the evaporation modules are, from functional viewpoint, mounted in parallel. Mounting the evaporation modules in parallel means that the injection flow rate into the evaporator is subdivided substantially equally among the plurality of evaporation modules making up the evaporator. In this configuration, therefore, the evaporator comprises an injection manifold and a collection manifold. By manifold is meant a part configured to receive an inflow which is divided into a plurality of outflows or a part configured to receive a plurality of inflows which are channeled into a single outflow. The injection manifold is, in one embodiment, a tubular element which is larger in diameter than the single injection elements of the evaporation modules. The single injection elements of the evaporation modules branch off from the injection manifold to supply the evaporation modules. In another embodiment, the injection manifold might be a pressurized liquid tank with as many outlets as there are evaporation modules and one inlet from the circulation pump of the separation system. The collection manifold is, in one embodiment, a tubular element which is larger in diameter than the single collection elements of the evaporation modules. The single collection elements of the evaporation modules converge on the collection manifold to collect the evaporated fluid. In another embodiment, the collection manifold might be a pressurized liquid tank with as many inlets as there are evaporation modules and one outlet directed to the phase separator of the separation system or directly to the compressor if the system does not have a separator.

The parallel variant embodiment allows obtaining important advantages in terms of heat exchange. The result of the total heat exchange coefficient of two exchangers in parallel is the sum of the total heat exchange coefficient of the single modules. Keeping the sum of the exchange surface areas of the single modules equal to the exchange surface area of a single evaporator, at constant total inflow rate and constant temperature difference between refrigerant fluid and product to be cooled, it is clear that increasing the total heat exchange coefficient increases the quantity of heat withdrawn. In the parallel variant embodiment, the total heat exchange coefficient between the two fluids can be kept high all the time during heat exchange because, for each evaporation module, heat exchange occurs with a refrigerant fluid with higher titration. Preferably, the holding time of the refrigerant in the single evaporation module is equal to what would be the holding time in the single evaporator, that is, without a modular evaporator.

In this parallel configuration, the evaporator also comprises, in one embodiment, a plurality of automatic valves and taps capable of selecting the path followed by the refrigerant fluid, isolating some of the modules if necessary and making the system more versatile.

In a third variant embodiment, a group of valves allows obtaining an increase in the versatility of the system which may, in use, modify its configuration. In other words, by automatically driving a group of valves, the evaporator could be switched from a first configuration with evaporation modules in series to a second configuration with evaporation modules in parallel, and vice versa. This variant embodiment is extremely advantageous for those applications requiring high machine versatility to meet a wide range of product flows and cooling requirements.

BRIEF DESCRIPTION OF THE DRAWINGS

The technical features of the disclosure and its advantages are more apparent from the detailed description which follows, with reference to the accompanying drawings which illustrate a preferred, non-limiting embodiment solely by way of example, and in which:

FIGS. 5A and 5B illustrate a series configuration of a modular evaporator comprising two evaporation modules and a functional diagram of that configuration;

FIGS. 6A and 6B illustrate a parallel configuration of a modular evaporator comprising two evaporation modules and a functional diagram of that configuration;

FIGS. 7A, 7B and 7C illustrate a variable configuration arrangement of a modular evaporator comprising two evaporation modules and a functional diagram of the variable configuration arrangement, in series in one case (FIG. 7C) and in parallel in the other (FIG. 7B);

DESCRIPTION OF THE PREFERRED EMBODIMENTS

Figure 1:
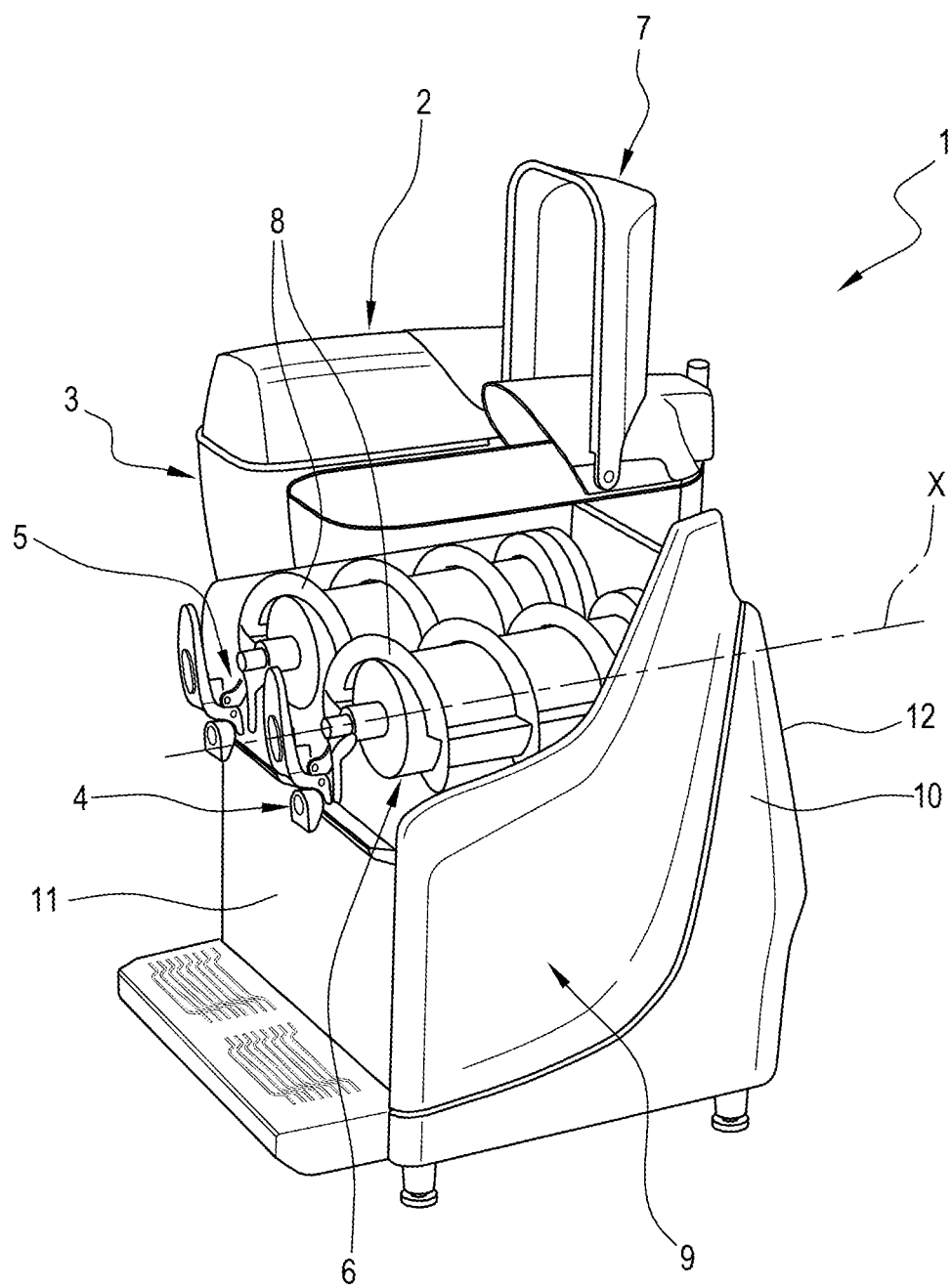
FIG. 1 illustrates a machine for making liquid or semi-liquid food products, specifically cold products such as, but not limited to, for example, slush drinks, sorbets dessert creams, or soft ice creams.

The numeral 1 in FIG. 1 denotes a machine for making liquid or semi-liquid food products, specifically cold products such as, but not limited to, for example, slush drinks, sorbets dessert creams, or soft ice creams, cold beverages, etc.

Figure 8:
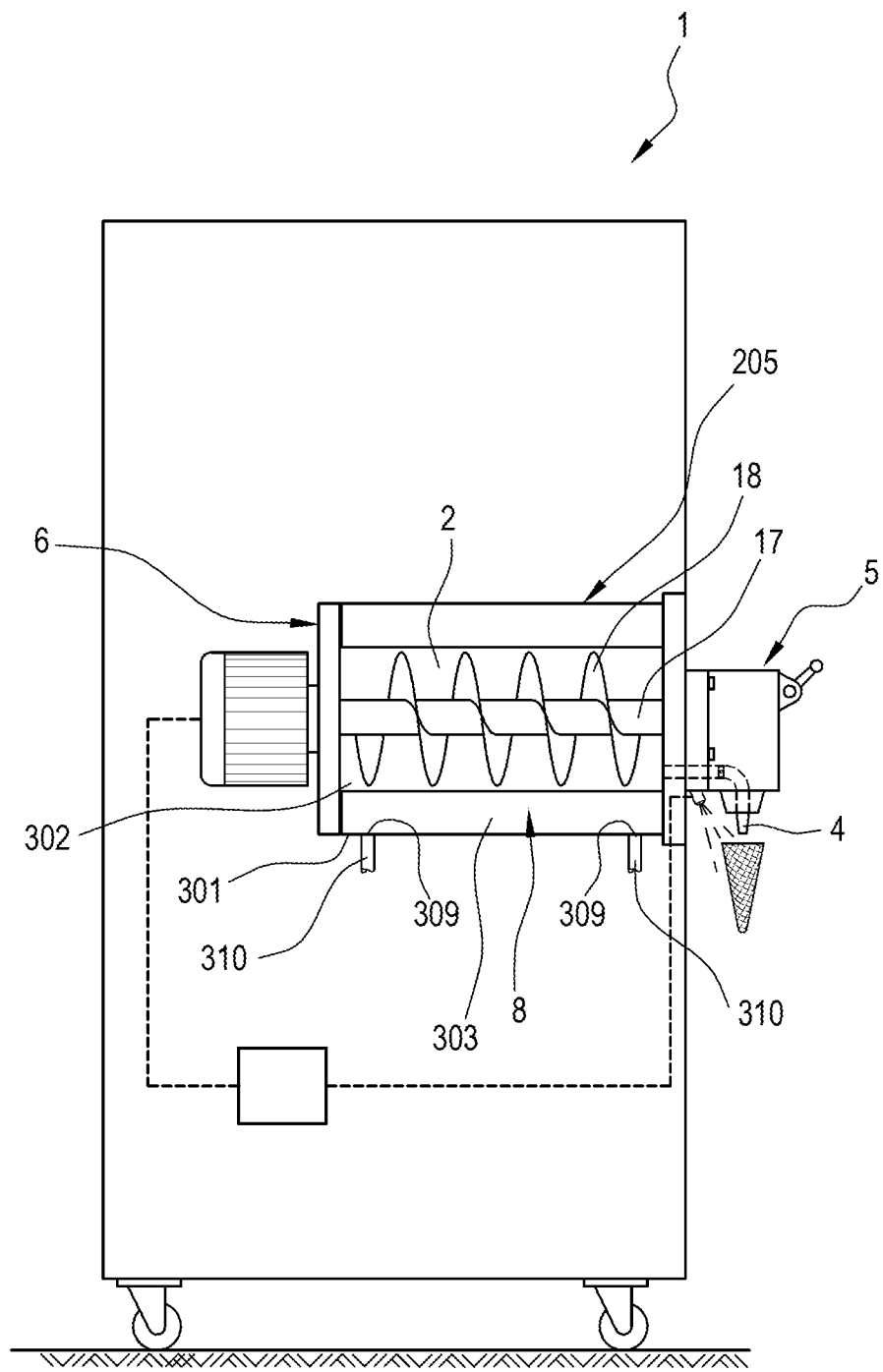
FIGS. 8 and 9 respectively illustrate further embodiments of the machine illustrated in FIG. 1.
Figure 9:
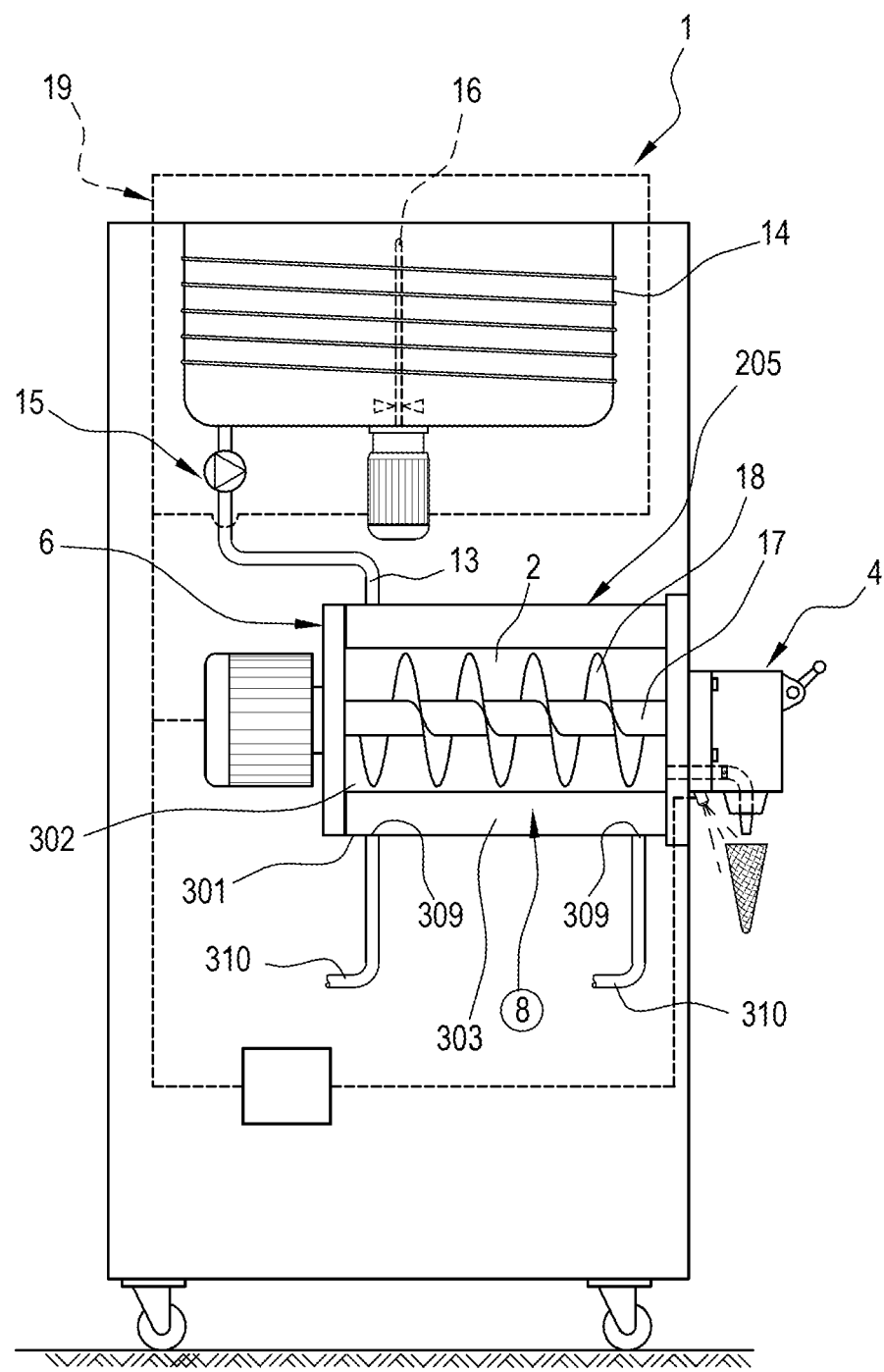

The numeral 1 in FIGS. 8 and 9 denotes a machine for making liquid or semi-liquid food products, specifically gelatos, soft ice creams or dessert creams.

In one embodiment (illustrated in FIG. 1), the machine 1 comprises at least one tank 2 (more generally an element 2) for containing and processing the product to be dispensed and having a front wall 11 which is provided with at least one mouth 4 for dispensing the product. In one embodiment, the containing tank 2 comprises a lid 7 hinged to the containing tank 2 itself. The machine 1 comprises a dispenser 5 located at the mouth 4 for dispensing the food product and movable between two operating configurations. In a first operating configuration, which we will call "On", the dispenser 5 allows the liquid or semi-liquid product to be dispensed through the dispensing mouth 4, whilst in a second operating configuration, which we shall call "Off", the dispenser 5 closes the dispensing mouth 4 and keeps the liquid or semi-liquid product in the containing tank 2.

With reference to the dispensing mouth 4, the machine 1 comprises a front wall 11, the wall on which the dispensing mouth 4 is mounted and from which the product or beverage is effectively dispensed, a rear wall 12 opposite to the front wall 11 and two side walls 9 substantially perpendicular to the front wall 11 and rear wall 12.

Also, with reference to the thermal treatment cylinder, we define a radial direction R outwards from the center of the axis of the thermal treatment cylinder 6 and perpendicular to the axis of rotation X.

In one embodiment, the machine comprises a thermal treatment cylinder 6 mounted inside the containing tank 2.

The machine 1 comprises at least one stirrer 8 for each thermal treatment cylinder 6. In a preferred embodiment, the stirrer 8 is mounted on the outside surface of the thermal treatment cylinder 6, wound around it in screw-like fashion. The stirrer 8 is adapted to rotate about an axis of rotation X, coinciding with the axis of symmetry of the thermal treatment cylinder 6, while remaining at all times in contact with the outside surface of the thermal treatment cylinder 6. With reference to the stirrer 8, we can thus define the aforementioned axis of rotation X, about which the stirrer 8 is made to rotate, and a radial direction R directed outwards from the axis of rotation X of the stirrer 8 and perpendicular to the axis of rotation X.

In one embodiment, the machine 1 comprises a containing compartment 9 which may house some of the components of the machine 1. In another embodiment, the machine 1 does not comprise the containing compartment 9 and the components are located at different positions of the machine.

In one embodiment, the machine 1 comprises a refrigeration system 20 to remove heat from the beverage or product to be dispensed.

Figure 2:
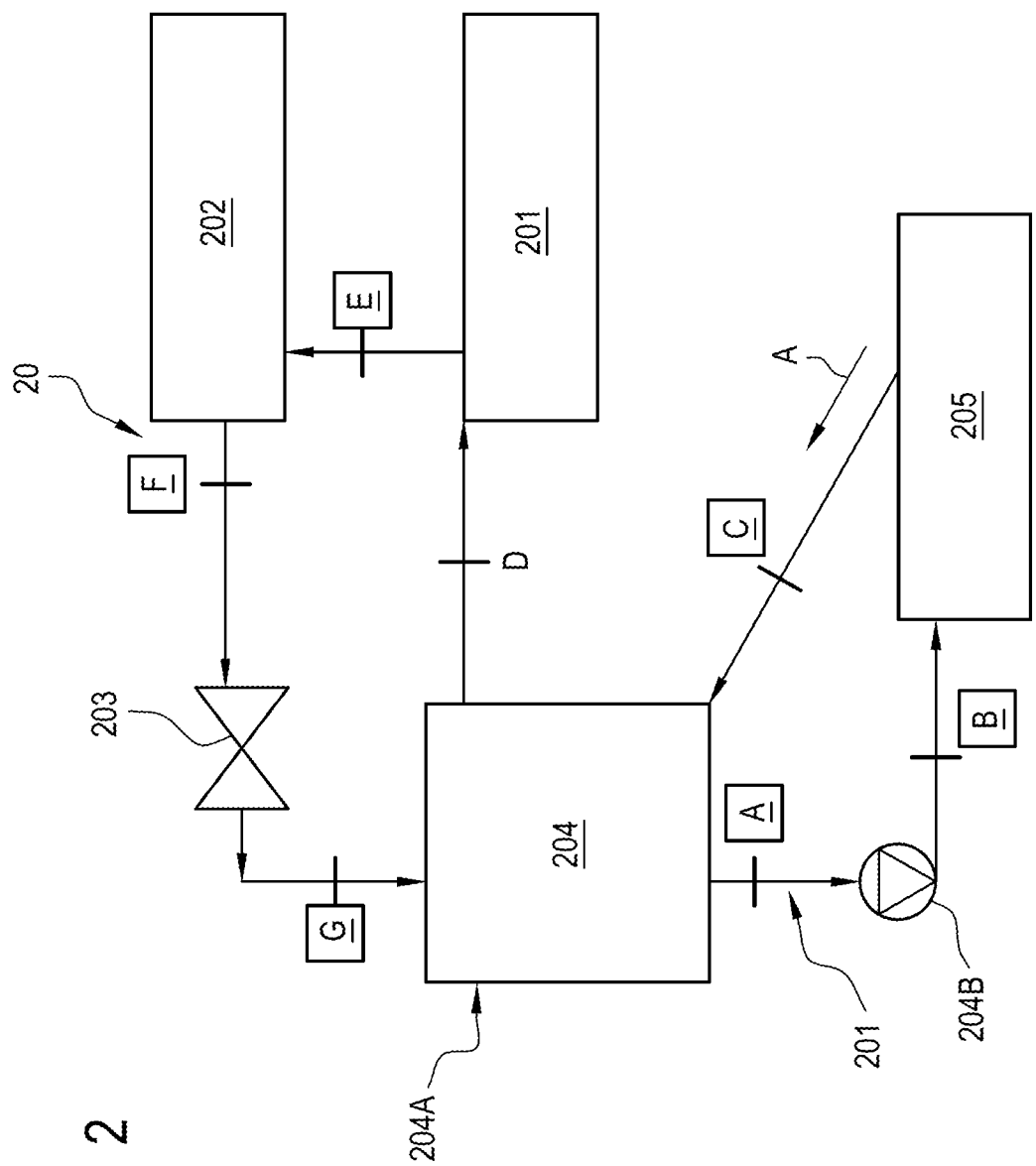
FIG. 2 is a system diagram of the refrigeration system of the machine.
Figure 3:
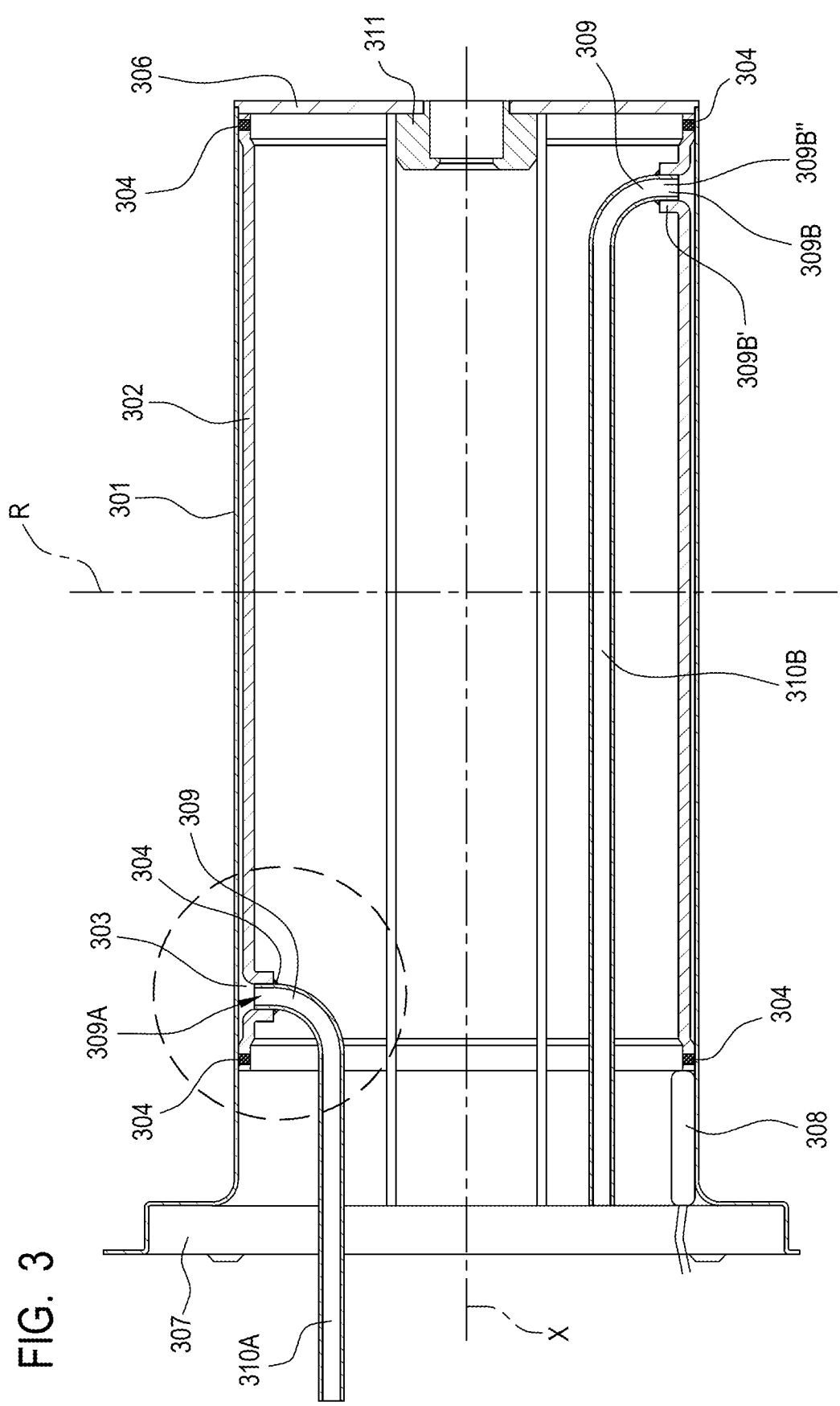
FIG. 3 illustrates a thermal treatment cylinder which also comprises the evaporator of the refrigeration system.
Figure 4:
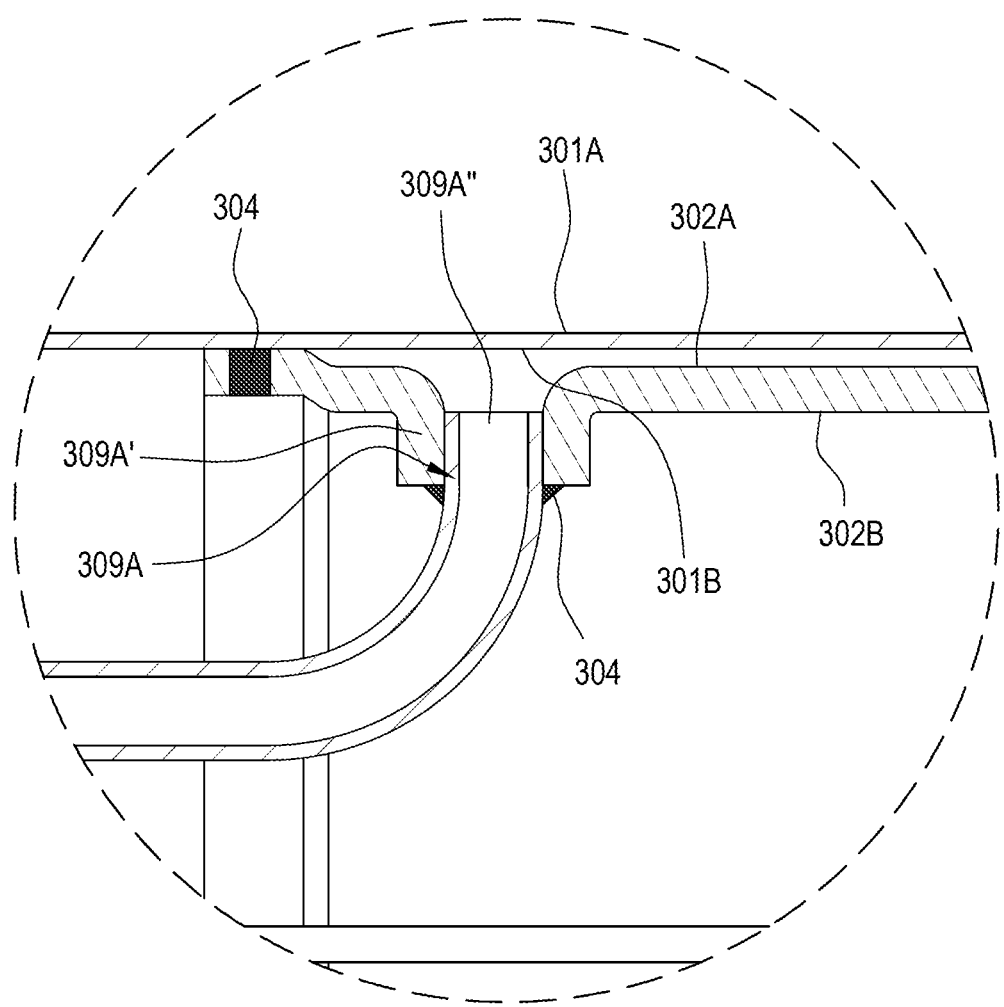
FIG. 4 illustrates the detail of an injection cavity connected to an injection element.

In one embodiment, illustrated in FIG. 2, the refrigeration system comprises a refrigerant fluid (or heat exchanger fluid) which defines a flow direction A of the refrigerant fluid inside the refrigeration system 20. The term "upstream" is used in this disclosure to indicate a component location situated before the one referred to in the direction of flow A of the heat exchanger fluid, whilst "downstream" is used to indicate a component location situated after the one referred to in the direction of flow A of the heat exchanger fluid. During the refrigeration cycle 20, the refrigerant fluid (or heat exchanger fluid) never reaches the state of superheated vapor. The thermodynamic states we refer to hereinafter are all referred to the refrigerant fluid. The term "state of phase coexistence" is used to mean the thermodynamic state of phase transition in which the refrigerant fluid is in both a liquid and a vapor state.

In one embodiment, the refrigeration system 20 comprises a compressor 201, a condenser 202, a pressure reducing element 203 and an evaporator 205.

It should be noted that the evaporator 205, as described below, is an evaporator of the type known as "flooded".

In another embodiment, the refrigeration system 20 also comprises a phase separation unit 204 (or phase separation system).

The compressor 201 is configured to compress the refrigerant fluid in the vapor state.

The compressor 201 comprises an inlet D with refrigerant fluid vapor from the separation unit 204, and an outlet E with vapor at high pressure directed to the condenser 202. In an embodiment not illustrated, the inlet D comes directly from the evaporator 205 after being checked for the absence of liquid dispersed in the vapor. In the system, the compressor is located upstream of the condenser 202 and downstream of the evaporator 205.

The condenser 202 is configured to condense the refrigerant fluid vapor from the compressor 201. In one embodiment, illustrated in FIG. 2, the condenser 202 is located downstream of the compressor 201 and upstream of the pressure reducing element 203. The condenser 202 comprises an inlet E with vapor at high pressure from the compressor 201, and an outlet F with saturated liquid at high pressure directed to the pressure reducing element 203.

The pressure reducing element 203 is configured to reduce the pressure of the saturated liquid from the condenser. In one embodiment, the pressure reducing element is a throttle valve 203 comprising a variable size orifice adapted to regulate the pressure loss obtained when the refrigerant fluid flows through the throttle valve 203 itself.

The throttle valve comprises an inlet F with saturated liquid at high pressure from the condenser 202 and an outlet G with vapor and liquid in a state of phase coexistence at low pressure, directed to the separation unit 204 or to the evaporator 205. In one embodiment, illustrated in the drawings, the throttle valve 203 in the refrigeration system is located downstream of the condenser 202 and upstream of the separation unit 204. In another embodiment, not illustrated in the drawings, the throttle valve 203 in the refrigeration system is located downstream of the condenser 202 and upstream of the evaporator 205, since the refrigeration system 20 is not provided with the separation unit.

The separation unit 204 is configured to separate the vapor phase from the liquid phase and to send only the vapor to the compressor and only the liquid to the evaporator. In one embodiment, the separation unit 204 comprises a phase separator 204A and a circulation pump 204B.

In one embodiment, the phase separator 204A comprises two inlets: a first inlet G, from the throttle valve 203, and a second inlet C, from the evaporator 205, both of which carry refrigerant fluid in the state of phase coexistence. In one embodiment, the phase separator 204A comprises two outlets: a first outlet A directed to the circulation pump 204B with refrigerant fluid in the saturated liquid state, and a second outlet D directed to the compressor 201 with refrigerant fluid in the saturated vapor state.

Thus, in this embodiment, the separation unit 204 is located downstream both of the throttle valve 203 and of the evaporator and upstream of both the evaporator 205 and of the compressor 201. Since the separation unit 204 is located both upstream and downstream of the evaporator, it follows that the evaporator in this embodiment forms part of a closed circuit 21 which withdraws fluid from the phase separator 204A and returns it into the same. The fluid in the liquid state from the outlet A of the phase separator 204A is processed by the circulation pump 204B which provides the pressure head necessary to overcome the load losses in the closed circuit 21.

In a further variant in addition to the one illustrated in FIG. 2, the separation unit comprises the phase separator 204A but not the pump 204B; in this variant, instead of the pump 204B illustrated in FIG. 2, the pressure head necessary to circulate the fluid inside the evaporator is provided by a static pressure of heat exchanger liquid acting at the inlet to the evaporator 205 (liquid column).

In practice, the phase separator 204A is mounted at a height above the evaporator 205.

In other words, the gravity acting on the liquid column between the phase separator 204A and the inlet of the evaporator 205 guarantees a static pressure which allows establishing circulation by "natural" convection between the phase separator 204A and the evaporator 205.

In this embodiment, there is preferably a regulator valve for regulating the level of the heat exchanger liquid column at the inlet to the evaporator 205 (from the pressure reducing element 203), that is for adjusting the hydraulic head of the liquid column at the inlet to the evaporator 205. The regulating valve regulates the entry of the heat exchanger fluid so as to keep the column of heat exchanger liquid at the inlet to the evaporator 205 at a predetermined height: that is to say, to keep the necessary static pressure of the heat exchanger fluid at the inlet to the evaporator 205 to allow the heat exchanger liquid itself to circulate in the evaporator 205 (by natural convection, as explained above).

In another embodiment not illustrated, the separation unit 204 comprises a phase separator 204A. In this embodiment, the phase separator 204A comprises an inlet from the evaporator 205 with refrigerant fluid in the state of phase coexistence and an outlet, directed to the compressor, with refrigerant fluid in the saturated vapor state. In this embodiment, the separation unit 204 is located upstream of the compressor 201 and downstream of the evaporator 205.

In one embodiment, the evaporator 205 comprises a first tubular element 301 and a second tubular element 302 coaxial with, and mounted in, the first tubular element 301. In one embodiment, the second tubular element 302 is a solid cylindrical element which may, if necessary, have the necessary through channels perforated in it. In one embodiment, the outside wall of the first tubular element 301 coincides with the outside wall of the thermal treatment cylinder 6.

In one embodiment, the first tubular element has an outside surface 301A and an inside surface 301B which are flat and smooth and free of any protrusions extending in the radial direction R. In one embodiment, the second tubular element has an outside surface 302A and an inside surface 302B which are flat and smooth and free of any protrusions extending in the radial direction R, with the exception of accesses to place the evaporator 205 in communication with the other components of the refrigeration system 20.

In one embodiment, the first tubular element 301 is smaller in radial thickness than the second tubular element 302 so as to reduce the space between the refrigerant fluid and the product to be cooled.

The evaporator also comprises a plurality of fastening elements to connect the components making up the evaporator. In a preferred embodiment, the fastening elements are weld spots 304 with filler material. In another embodiment, not illustrated, the fastening elements may be special glues capable of sealedly connecting to each other the first tubular element 301 and the second tubular element 302. In a preferred embodiment, the weld spots 304 are located on opposite sides of the first tubular element 301 and second tubular element 302.

In one embodiment, the evaporator comprises a closing wall 306 in the shape of a circular crown whose external radius is equal to the external radius of the first tubular element 301 and which is located at the end of the first tubular element 301 and of the second tubular element 302 facing the front wall 11. The internal radius of the closing wall, on the other hand, is determined by the size of a drive shaft keyed to the stirrer 8, which rests on the collar 311 of the thermal treatment cylinder.

In one embodiment, the first tubular element 301, at the end of it facing the rear wall 12, comprises a flange 307 by which the evaporator is connected to the machine 1 with suitable connectors.

In one embodiment, the evaporator also comprises a temperature sensor 308 placed in contact with the inside wall 301B of the first tubular element 301.

The first tubular element 301 and the second tubular element 302 are disposed, and fastened by the weld spots 304 in such a way as to form an annular chamber 303 characterized by a radial extension r, defined as the difference between the internal diameter of the first tubular element 301 and the external diameter of the second tubular element 302, by an axial extension p, defined as the length of the annular chamber 303 along the axis of rotation X, and by an angular extension a defined as the angle subtended by the annular chamber 303 relative to the center of the base circles of the first and second tubular elements 301 and 302.

In one embodiment, the annular chamber has a radial extension r which is less than 4 mm, an axial extension p substantially equal to the axial extension of the first and second tubular elements 301 and 302, minus losses of axial extension due to the weld spots between the first tubular element 301 and the second tubular element 302, and an angular extension a equal to 2π.

In one embodiment, the annular chamber has a radial extension r which is less than 2 mm, an axial extension p substantially equal to the axial extension of the first and second tubular elements 301 and 302, minus losses of axial extension due to the weld spots between the first tubular element 301 and the second tubular element 302, and an angular extension a equal to 2π.

In one embodiment the evaporator 205 comprises a plurality of accesses 309 to the annular chamber 303. Some of the plurality of accesses 309 are used to let the fluid flow into the annular chamber 303. Some of the plurality of accesses 309 are used to let the fluid flow out of the annular chamber 303.

In one embodiment, the plurality of accesses is defined by a hole 309A" and by a guide 309A' made in the second tubular element 302.

In a preferred embodiment, the evaporator comprises an access 309, which we shall call "inlet access" 309A, disposed at the end of the second tubular element 302 facing the rear wall 12. The evaporator comprises an access 309, which we shall call "outlet access" 309B, disposed at the end of the second tubular element 302 facing the front wall 11.

In one embodiment the evaporator 205 comprises a plurality di access elements 310 to let the refrigerant fluid reach the annular chamber 303. Some of the plurality of access elements 310 are used to transport the fluid into the annular chamber 303. Some of the plurality of access elements 310 are used to transport the fluid out of the annular chamber 303.

In one embodiment, the plurality of access elements comprises a heat resistant pipe having at least one curve at the access points 309.

In a preferred embodiment, the evaporator comprises an access element 310, which we shall call "injection element" 310A, configured to be joined to the access cavity 309A by weld spots. In this embodiment, the hole 309A" is substantially equal in diameter to the heat-resistant pipe 310A. The evaporator comprises an access element 310, which we shall call "outlet element" 310B, configured to be joined to the access cavity 309B by weld spots. In this embodiment, the hole 309B" is substantially equal in diameter to the heat-resistant pipe 310B. The heat resistant pipes 310A and 310B are operatively traversed by refrigerant fluid in the liquid state for the injection element 310A and in the state of phase coexistence for the injection element 310B.

In one embodiment, the evaporator 205 may consist of two or more modules 401 mounted in different configurations. In this case, we will refer to the evaporator as a modular evaporator 40. The possibility of varying the connection between the modules 401 allows defining three embodiments of the modular evaporator 40.

All three embodiments comprise a first single tubular element 301 and a second tubular element divided into as many units 302', 302" as there are modules 401 in the modular evaporator 40.

Figure 5B:
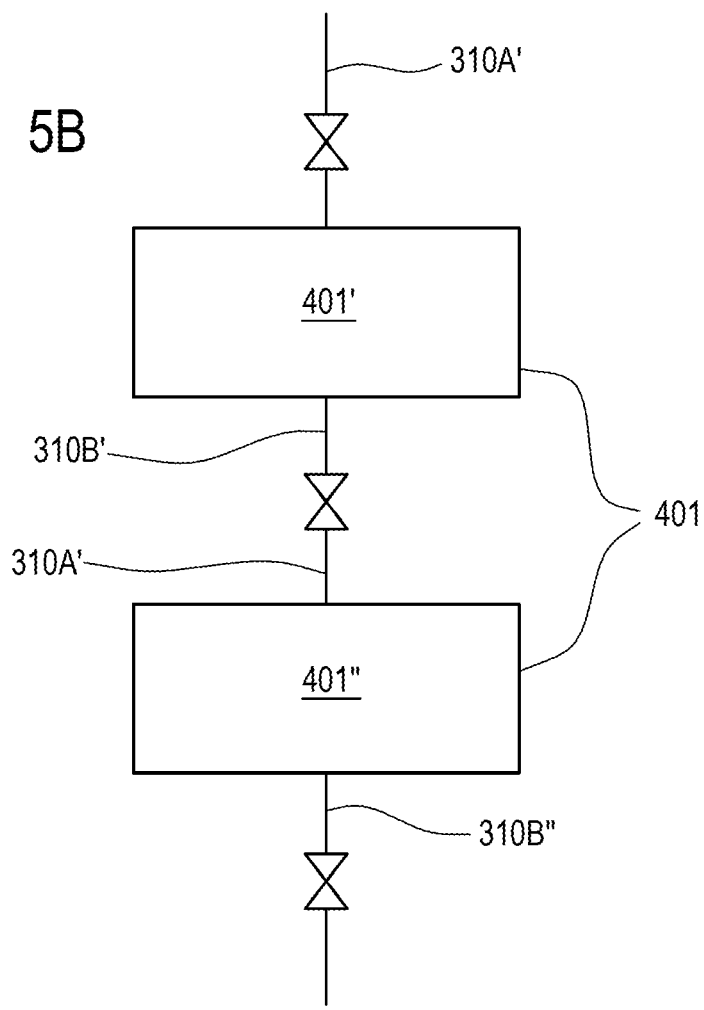

In a first embodiment, illustrated in FIG. 5A, from the constructional viewpoint and in FIG. 5B from the schematic viewpoint, the modules 401 are mounted in series. In this embodiment, the first module 401' receives the full flow of refrigerant fluid from the injection element 310A', evaporates it and collects with the collection element 310B'. In this embodiment, the collection element 310B' and the injection element 310A" of the second module 401" are the same component of the modular evaporator 40. The same flow of refrigerant fluid, in a thermodynamic state different from that the inlet to the module 401' is then directed into the second module 401" from which it is then collected with the collection element 310B".

Figure 6B:
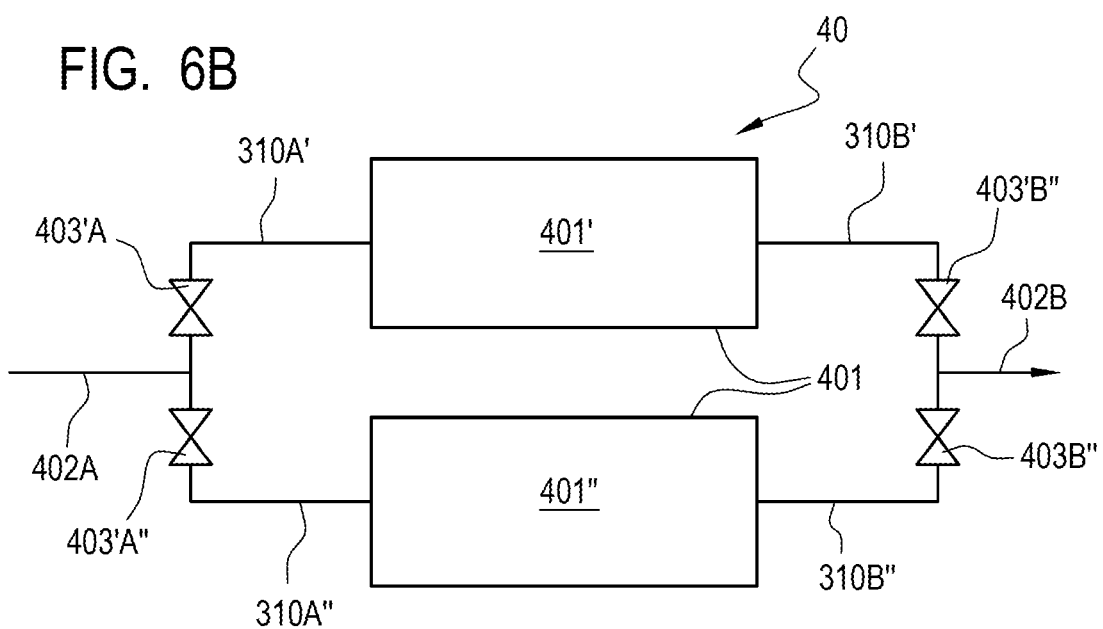

In a second embodiment, illustrated in FIG. 6A, from the constructional viewpoint and in FIG. 6B from the schematic viewpoint, the modules 401 are mounted in parallel. In this embodiment, the first module 401' receives from the injection element 310A' a flow of refrigerant fluid equal to the total flow in the circuit divided by the number of modules 401. The first module 401' processes the refrigerant fluid and collects it with the collection element 310B'. In the same way, the second module 401" receives from the injection element 310A' a flow of refrigerant fluid equal to the total flow in the circuit divided by the number of modules 401. The second module 401" processes the refrigerant fluid and collects it with the collection element 310B'.

In this embodiment, the injection elements 310A' and 310A" of the respective modules 401' and 401" branch off from a manifold 402A which carries the full flow of refrigerant fluid. In this embodiment, the collection element 310B' and 310B" of the respective modules 401' and 401" converge on a manifold 402B which carries the full flow of refrigerant fluid.

In the parallel embodiment, one of the modules 401 can be operatively isolated so as to work with one module only. In this case, purely by way of non-limiting example, the user can isolate the module 401' from an interface by closing the valves 403A' and 403B' and keeping the valves 403A" and 403B" open instead.

Figure 7B:
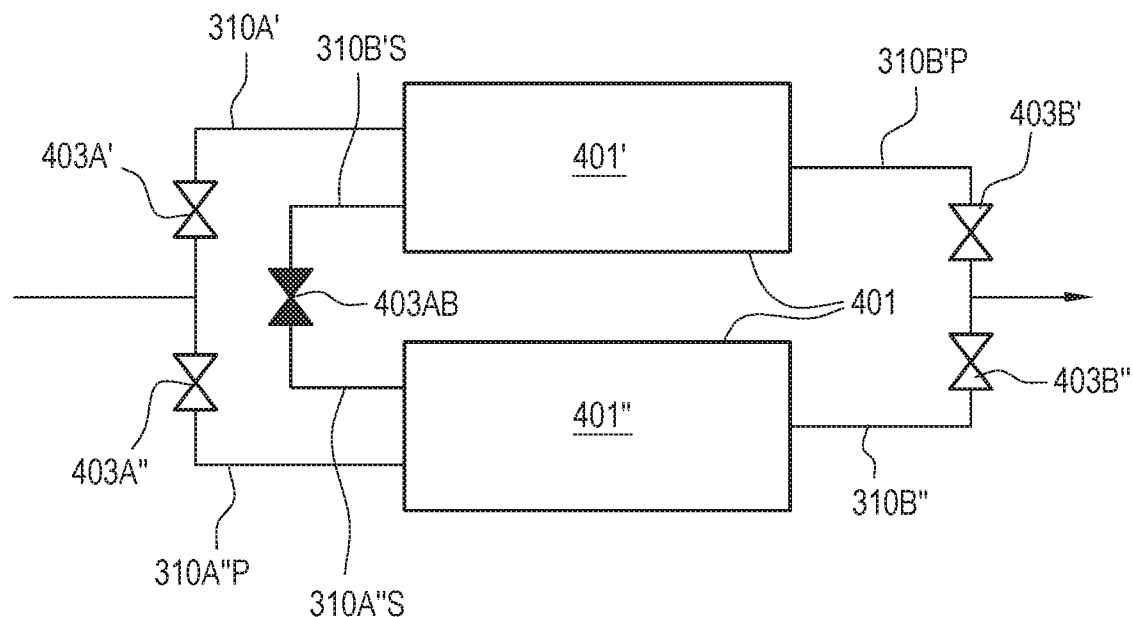
Figure 7C:
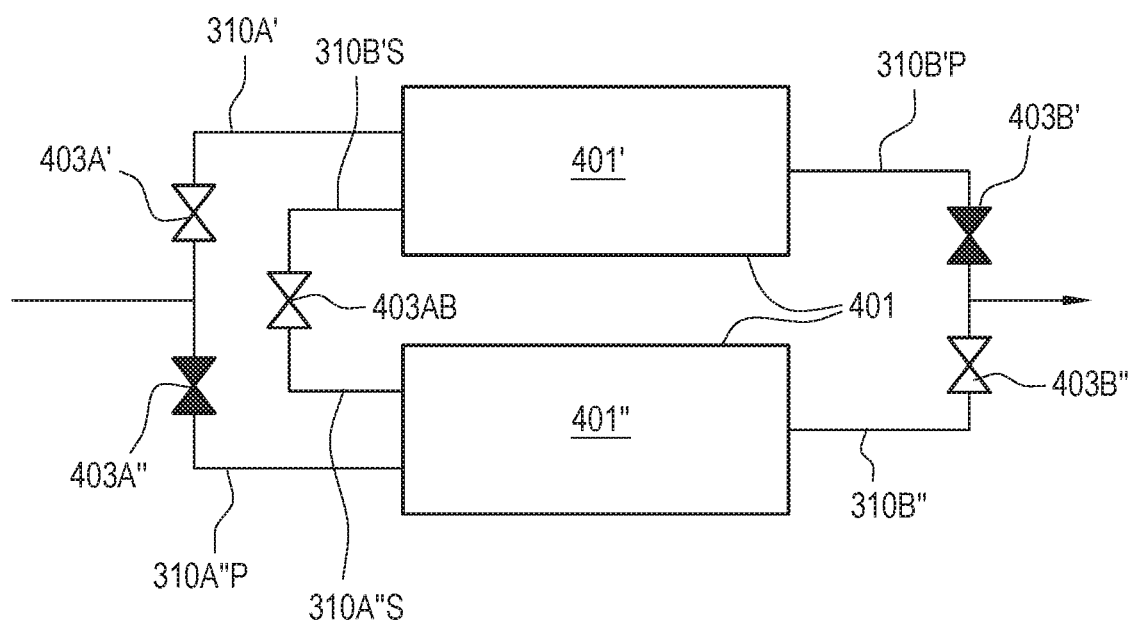

In a third embodiment, illustrated in FIG. 7A, from the constructional viewpoint and in FIGS. 7B and 7C from the schematic viewpoint, it is possible to vary the configuration of the evaporator by switching from a series arrangement to a parallel arrangement.

In this embodiment, the first module 401' comprises an inlet element 310A' and two outlet elements 310B': a first outlet element 310B'S which is active, that is, traversed by refrigerant fluid, in the series arrangement, and a second outlet element 310B'P which is active in the parallel arrangement.

In this embodiment, the second module 401" comprises an outlet element 310B" and two inlet elements 310A": a first inlet element 310A"S which is active, that is, traversed by refrigerant fluid, in the series arrangement, and a second inlet element 310A"P which is active in the parallel arrangement.

In this embodiment, with reference to the configuration of the valves in the parallel arrangement of FIG. 6B, the modular evaporator 40 comprises a further valve 403AB, opened only in the series arrangement.

FIGS. 7B and 7C illustrate the configuration of the valves in the two selectable arrangements. More specifically, the series arrangement is shown in FIG. 7C. In this arrangement, the valves 403A', 403AB and 403B" (white) are open, while the valves 403A" and 403B' (black) are closed. The parallel arrangement is shown in FIG. 7B. In this arrangement, the valves 403A', 403A", 403B' and 403B" (white) are open, while the valve 403AB (black) is closed.

In another embodiment of the machine 1, illustrated in FIG. 8, the thermal treatment cylinder 6 defines the product containing element. In effect, the thermal treatment cylinder 6 contains and processes the product. The thermal treatment cylinder 6 comprises the evaporator 205. In this embodiment, besides all the accesses necessary to supply the evaporator 205, the thermal treatment cylinder must be provided with an access connected to a feed hopper, not illustrated in the drawings.

In this embodiment, the stirrer 8 is mounted inside the thermal treatment cylinder 6. In one embodiment, the stirrer 8 is a screw 18 wound helically round a drive shaft 17. The maximum diameter of this screw is, at most, equal to the internal diameter of the second tubular element 302 of the evaporator 205.

In this embodiment, the accesses 309 and the annular chamber 303 are formed on the first tubular element 301. In this embodiment, the access elements 310 for reaching the accesses 309 on the annular chamber 303 follow a path outside the internal cavity formed by the second tubular element 302.

In a third embodiment, illustrated in FIG. 9, the machine 1 is substantially similar to the embodiment illustrated in FIG. 8 but, in addition, comprises a preparation unit 19 for preparing the basic product.

The preparation unit 19 comprises a preparation tank 16, containing the basic product. The preparation unit 19 comprises a mixer, mounted inside the preparation tank, for mixing the basic product. The preparation unit 19 comprises a circulation pump 15 configured to pump the basic product through a feed duct 13 to the containing element which, in this embodiment, is the thermal treatment cylinder 6. In this embodiment, therefore, the machine is capable of working practically continuously. In another embodiment, the preparation unit does not have the circulation pump 15 and the basic product falls by gravity from the preparation tank 16 into the thermal treatment cylinder 6.

Thanks to the provision of an evaporator 205 of the "flooded" type, the machine 1 of this invention has the advantage of using the heat exchange surfaces of the evaporator 205 more effectively because they are completely wet (and thus heat exchange with the product is more efficient).

Another advantage of the machine 1 of this invention due to the provision of an evaporator 205 of the "flooded" type, is that the compressor 201 receives saturated vapor instead of superheated vapor and, consequently, the temperature of the refrigerant entering is lower and reduces the temperature it has when it leaves the compressor.

Moreover, it should also be stressed that in the event of a sudden/rapid increase in the refrigeration heat load in the machine 1 (for example, due to loading of basic ingredients at a high temperature), part of the liquid accumulated evaporates, which mans that the evaporator 205 is particularly flexible with regard to heat loads.

According to another aspect of it, the disclosure also defines a method for making and dispensing cold or iced, liquid or semi-liquid food products in a machine as disclosed herein, comprising the following steps:

preparing at least one basic product inside the element 2 for containing the product;

activating the refrigeration system 20 to cause the refrigerant fluid to flow through the separation system 204A, the evaporator 205, the compressor 201, the condenser 202 and the pressure reducing element 203 and, through the separation system 204A, to send refrigerant fluid in the saturated liquid state to the evaporator 205 and refrigerant fluid in the saturated vapor state to the compressor 201;

cooling the basic product by causing heat to be absorbed by the evaporator 205 and simultaneously rotating the stirrer 8 about the respective axis of rotation X in order to convert the at least one basic product into a cold or iced, liquid or semi-liquid food product.

More precisely, the step of activating the refrigeration system 20 comprises a step of activating the compressor 201.

According to another aspect, the step of activating the refrigeration system 20 comprises a step of activating the circulation pump 204B.

According to another aspect of the method, during the step of cooling the at least one basic product, at least part of the refrigerant fluid is in the saturated liquid phase and in contact with walls of the evaporator 205 (so as to wet the walls, that is, flood the annular chamber 303). It should be noted that the walls which are in contact with a part of the refrigerant fluid in the saturated liquid state separate the product being processed from the refrigerant fluid.

Thus, the resulting heat exchange is particularly efficient.

What is claimed is:

1. A machine for making and dispensing a cold or iced, liquid or semi-liquid food product, comprising:
    a container including an interior volume for containing the cold or iced, liquid or semi-liquid food product to be dispensed and including a mouth for dispensing the cold or iced, liquid or semi-liquid food product;
    a dispenser located at the mouth for dispensing the cold or iced, liquid or semi-liquid food product and able to be turned on or off to allow the cold or iced, liquid or semi-liquid food product to be dispensed;
    a stirrer including a shaft, coaxial with the thermal treatment cylinder and configured to rotate about an axis of rotation;
    a refrigeration system comprising an evaporator, a condenser, a pressure reducing valve, a compressor and a refrigerant fluid for circulating through the refrigeration system;
    wherein the evaporator comprises a first tubular member and a second tubular member extending along an axial direction parallel to the axis of rotation, the second tubular member being positioned inside the first tubular member to define an annular chamber extending uninterruptedly along the axial direction and through which the refrigerant fluid is configured to flow such that the first tubular member and the second tubular member act as evaporator surfaces, wherein at least one chosen from the first tubular member and the second tubular member act as a thermal treatment cylinder when the refrigerant fluid flows through the annular chamber,
    the refrigeration system further comprising a separation system for separating phases of the refrigerant fluid, the refrigeration system being configured to send the refrigerant fluid in a saturated liquid state to the evaporator and the refrigerant fluid in a saturated vapor state to the compressor;
    the stirrer being positioned externally to the first tubular member and the second tubular member;
    the evaporator further comprising a closing wall shaped as a circular crown which is located at one end of the first tubular element and the second tubular element facing toward a front wall of the machine, the closing wall including an inner aperture for the shaft of the stirrer;
    wherein an extension of the annular chamber along a radial direction is less than 8 mm.

2. The machine according to claim 1, wherein the second tubular member has a smooth outside surface, without protrusions, extending in a radial direction inside the annular chamber.

3. The machine according to claim 1, wherein the separation system comprises at least one phase separator and at least one circulation pump.

4. The machine according to claim 1, wherein the at least one phase separator comprises a first inlet from the pressure reducing valve, configured to channel the refrigerant fluid in phase transition, and a second inlet from the evaporator, also configured to channel the refrigerant fluid in phase transition.

5. The machine according to claim 1, wherein the at least one phase separator comprises a first outlet directed to the evaporator, configured to channel the refrigerant fluid in the saturated liquid state, and a second outlet directed to the compressor, configured to channel the refrigerant fluid in the saturated vapor state.

6. The machine according to claim 1, wherein the refrigerant fluid, in the evaporator, is in the saturated liquid state or in phase transition.

7. The machine according to claim 1, wherein the evaporator comprises a plurality of fastening elements between the first tubular member and the second tubular member and a plurality of accesses to the annular chamber defined by a gap between the first tubular member and the second tubular member.

8. The machine according to claim 7, wherein the plurality of fastening elements are welds.

9. The machine according to claim 7, wherein the plurality of accesses to the evaporator comprises at least one injection cavity configured to receive an injection pipe configured to feed in the refrigerant fluid, and at least one collection cavity configured to receive an outlet pipe configured to receive the refrigerant fluid flowing out.

10. The machine according to claim 9, wherein the at least one injection cavity is positioned in an end of the thermal treatment cylinder facing towards a first wall opposite a second wall where the dispensing mouth is positioned and wherein the at least one collection cavity is positioned in an end of the thermal treatment cylinder facing towards the second wall where the dispensing mouth is positioned, so as to allow the refrigerant fluid to flow from the at least one injection cavity to the at least one collection cavity along the annular chamber.

11. The machine according to claim 1, wherein the evaporator is modular and comprises a plurality of evaporation modules connected to each other in series or in parallel.

12. The machine according to claim 1, comprising a preparation tank for preparing a basic product and operatively connected to the container to feed the basic product to the container.

13. A method for making and dispensing a cold or iced, liquid or semi-liquid food product, comprising the following steps:
    providing a machine comprising:
        a container including an interior volume for containing the cold or iced, liquid or semi-liquid food product to be dispensed and including a mouth for dispensing the cold or iced, liquid or semi-liquid food product;
        a dispenser located at the mouth for dispensing the cold or iced, liquid or semi-liquid food product and able to be turned on or off to allow the cold or iced, liquid or semi-liquid food product to be dispensed;
        a stirrer including a shaft, coaxial with the thermal treatment cylinder and configured to rotate about an axis of rotation;
        a refrigeration system comprising an evaporator, a condenser, a pressure reducing valve, a compressor and a refrigerant fluid for circulating through the refrigeration system;
    wherein the evaporator comprises a first tubular member and a second tubular member extending along an axial direction parallel to the axis of rotation, the second tubular member being positioned inside the first tubular member to define an annular chamber extending uninterruptedly along the axial direction and through which the refrigerant fluid is configured to flow such that the first tubular member and the second tubular member act as evaporator surfaces, wherein at least one chosen from the first tubular member and the second tubular member act as a thermal treatment cylinder when the refrigerant fluid flows through the annular chamber,
    the refrigeration system further comprising a separation system for separating phases of the refrigerant fluid, the refrigeration system being configured to send the refrigerant fluid in a saturated liquid state to the evaporator and the refrigerant fluid in a saturated vapor state to the compressor;
    the stirrer being positioned externally to the first tubular member and the second tubular member;
    the evaporator further comprising a closing wall shaped as a circular crown which is located at one end of the first tubular element and the second tubular element facing toward a front wall of the machine, the closing wall including an inner aperture for the shaft of the stirrer;
    wherein an extension of the annular chamber along a radial direction is less than 8 mm:
    preparing at least one basic product inside the container,
    activating the refrigeration system to cause the refrigerant fluid to flow through the separation system, the evaporator, the compressor, the condenser and the pressure reducing valve and, through the separation system, to send the refrigerant fluid in the saturated liquid state to the evaporator and the refrigerant fluid in the saturated vapor state to the compressor;
    cooling the at least one basic product by causing heat to be absorbed by the evaporator and simultaneously rotating the stirrer about the axis of rotation to convert the at least one basic product into the cold or iced, liquid or semi-liquid food product.

14. The method according to claim 13, wherein, during the step of cooling the at least one basic product, at least part of the refrigerant fluid is in the saturated liquid phase and in contact with walls of the evaporator.

* * * * *